United States Patent
Jeggle

(10) Patent No.: US 9,551,380 B2
(45) Date of Patent: Jan. 24, 2017

(54) RIGID FLANGE COUPLING AND ASSOCIATED INTERNAL CONNECTION ASSEMBLY

(71) Applicant: TRANSMISSION COMPONENTS (PTY) LTD, Kempton Park, Johannesburg (ZA)

(72) Inventor: Kurt Jeggle, Johannesburg (ZA)

(73) Assignee: Transmission Components (PTY) LTD., Johannesburg (ZA)

( * ) Notice: Subject to any disclaimer, the term of this patent is extended or adjusted under 35 U.S.C. 154(b) by 295 days.

(21) Appl. No.: 14/016,334

(22) Filed: Sep. 3, 2013

(65) Prior Publication Data

US 2014/0064834 A1   Mar. 6, 2014

(30) Foreign Application Priority Data

Sep. 3, 2012   (ZA) .................................. 2012/06581

(51) Int. Cl.
  *F16D 1/04*   (2006.01)
  *F16D 1/05*   (2006.01)
  *F16D 1/096*   (2006.01)

(52) U.S. Cl.
  CPC . *F16D 1/04* (2013.01); *F16D 1/05* (2013.01); *F16D 1/096* (2013.01); *Y10T 403/55* (2015.01); *Y10T 403/551* (2015.01)

(58) Field of Classification Search
  CPC .............. F16D 1/02; F16D 1/033; F16D 1/04; F16D 1/05; F16D 1/08; F16D 1/0835; F16D 1/0852; F16D 1/0864; F16D 1/09; F16D 1/092; F16D 1/096; Y10T 403/55; Y10T 403/551; Y10T 403/555; Y10T 403/557; Y10T 403/559; Y10T 403/7058; F16B 2/14

See application file for complete search history.

(56) References Cited

U.S. PATENT DOCUMENTS

| | | | | |
|---|---|---|---|---|
| 1,051,427 A * | 1/1913 | McCluskey | .................... | 285/322 |
| 1,377,101 A * | 5/1921 | Sparling | ........................ | 403/313 |
| 1,732,355 A * | 10/1929 | Craig | ............................ | 403/308 |
| 2,151,831 A * | 3/1939 | Buccicone | .................... | 403/370 |
| 2,460,631 A * | 2/1949 | Fawick | ............................ | 403/16 |
| 3,884,049 A * | 5/1975 | Pauli | .............................. | 464/73 |

(Continued)

FOREIGN PATENT DOCUMENTS

| | | | |
|---|---|---|---|
| DE | 29715962 U1 * | 11/1997 | |
| DE | 19828628 C1 * | 2/2000 | ............... F16D 1/09 |

(Continued)

*Primary Examiner* — Daniel P Stodola
*Assistant Examiner* — Jonathan Masinick
(74) *Attorney, Agent, or Firm* — Nixon Peabody LLP; Jeffrey L. Costellia

(57) ABSTRACT

This invention concerns a partially discontinuous inner sleeve for use in a rigid flange coupling. The partially discontinuous sleeve has an internal cylindrical passage for, in use, receiving an end of a shaft. The partially discontinuous sleeve further has at least two partial discontinuities along the length of the sleeve in the form of two discrete axial slits in the sleeve. These slits are displaced from each other to form a connecting formation between them. The invention further concerns an internal connection assembly including the partially discontinuous in the sleeve, and a rigid flange coupling including such internal connection assembly.

11 Claims, 6 Drawing Sheets

(56) References Cited

U.S. PATENT DOCUMENTS

| | | | | |
|---|---|---|---|---|
| 3,887,290 A | * | 6/1975 | Taylor | 403/370 |
| 4,140,413 A | * | 2/1979 | Conrad | 403/370 |
| 4,317,596 A | * | 3/1982 | Lemmon | 301/1 |
| 4,411,551 A | * | 10/1983 | Adelbratt | 403/370 |
| 4,781,486 A | * | 11/1988 | Mochizuki | 403/303 |
| 2007/0092332 A1 | * | 4/2007 | Moore | 403/292 |

FOREIGN PATENT DOCUMENTS

| | | | | |
|---|---|---|---|---|
| DE | 19939729 A1 | * | 2/2001 | F16D 1/05 |
| EP | 1191230 A1 | * | 3/2002 | F04D 29/04 |
| FR | 452268 | * | 5/1913 | |
| GB | 1041238 A | * | 9/1966 | |
| WO | WO 2013049885 A1 | * | 4/2013 | |
| ZA | 2008/03392 | | 4/2009 | |

* cited by examiner

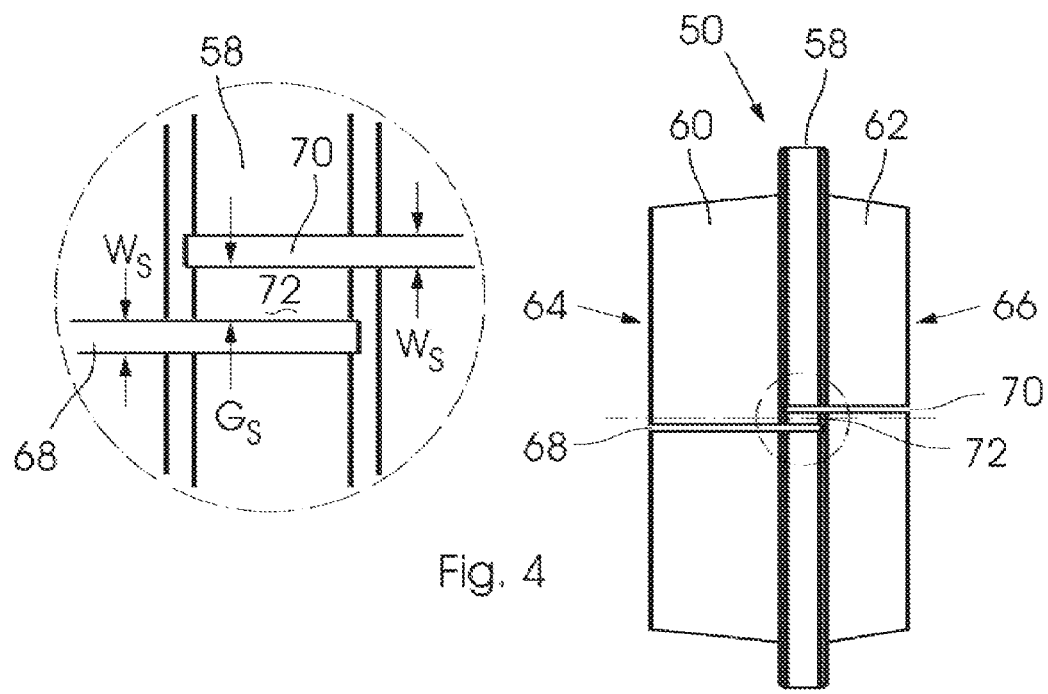
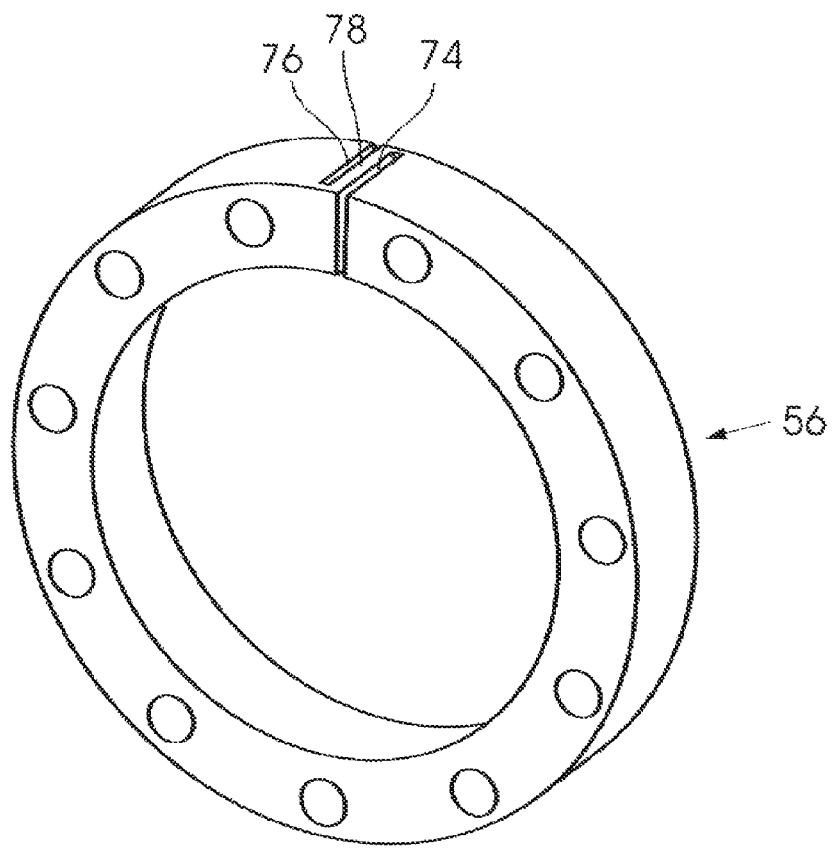

RIGID FLANGE COUPLING AND ASSOCIATED INTERNAL CONNECTION ASSEMBLY

BACKGROUND OF THE INVENTION

THIS invention relates to a rigid flange coupling, and in particular, to a partially discontinuous inner sleeve for use in such rigid flange coupling.

Rigid flange couplings are typically used to fasten or join the ends of two shafts axially in order to transmit power and torque between the two shafts.

One type of prior art rigid flange coupling comprises an outer flange defining a stepped cylindrical passage which holds an internal connection assembly to connect frictionally with the end of a shaft. The internal connection assembly comprises a discontinuous inner sleeve defining a cylindrical passage or bore to hold frictionally the end of a shaft, the discontinuous sleeve having a cut out or slit in its wall in order to assist with the alignment and fastening of the internal connection assembly onto the shaft. The outer surface of the inner sleeve defines a protruding rim with tapered surfaces extending from the protruding rim to the two ends of the inner sleeve. The internal connection assembly further comprises two annular rings with tapered inner surfaces to provide a self-locking mechanism when the two annular rings are secured on either side of the protruding rim.

One disadvantage that has been identified with the above-mentioned prior art rigid flange coupling device is that, due to the cut out or slit in the wall of the inner sleeve, misalignment of the rigid flange coupling, in particular of the inner sleeve on the shaft, may occur, which may result in damage to the rigid flange coupling or alternatively, may cause an inability to secure the annular rings and sleeve to each other.

Also, it has been found that the interlocking tapered surfaces of the annular rings and inner sleeve may prevent the dismantling of the rigid flange coupling from a shaft.

South African Patent No. 2008/03992 addressed at least some of the above drawbacks by providing a partially discontinuous inner sleeve having a connecting formation that extend between an inner surface of the sleeve into a protruding ridge defined on an outer surface of the inner sleeve. A major drawback of this prior art is that during the removal of the unit the connecting formation, i.e., the remaining portion of the discontinuous split, often breaks, which makes the advantage provided by the prior art null and void as reuse of the unit is impossible.

It is an object of the present invention to address the above problems and to provide an alternative rigid flange coupling.

SUMMARY OF THE INVENTION

According to a first aspect of the invention there is provided a partially discontinuous inner sleeve for use in a rigid flange coupling, the partially discontinuous sleeve defining an internal cylindrical passage for, in use, receiving an end of a shaft, the partially discontinuous sleeve having at least two partial discontinuities running along the length of the sleeve in the form of two discrete axial slits in the sleeve, the slits being displaced from each other to form a connecting formation therebetween.

The inner sleeve may comprise a protruding ridge on an outer surface of the sleeve and two tapered surfaces extending from each side of the protruding ridge to the respective, axially spaced apart ends of the sleeve.

Preferably, each slit runs from one end of the inner sleeve through the protruding ridge and terminates at the other end of the protruding ridge, i.e., the end of the protruding ridge distal to the end at which the slit starts.

The two slits may be parallel to each other.

The slits may be displaced from each other between 2 to 8 mm, thereby forming a connecting formation with a width of 2 to 8 mm.

Each slit may have a width of between 2 to 8 mm.

One of the tapered surfaces extending from respective sides of the protruding ridge may be tapered at a 6 to 8 degree angle, preferably at a 7 degree angle. The other tapered surface extending from the other side of the protruding ridge may be tapered at a 4 to 6 degree angle, preferably at a 5 degree angle.

According to a second aspect of the invention there is provided an internal connection assembly for use in a rigid flange coupling, the internal connection assembly comprising a partially discontinuous sleeve according to the first aspect of the invention, and an inner and outer ring, each of the inner and outer rings defining at least a partial discontinuity in a side wall.

The discontinuity in the outer ring may be in the form of two partial parallel slits in a side wall of the outer ring, the slits being displaced from each other thereby to form an outer ring connecting formation.

The outer ring slits may typically have a width of between 2 to 6 mm.

The displacement of the slits, i.e. the width of the outer ring connecting formation, may be about 2 to 8 mm.

Each of the inner and outer rings may define an internal tapered surface to engage frictionally the two tapered surfaces extending from a protruding ridge defined by the sleeve. The tapered surface of the outer ring may be tapered at a 6 to 8 degree angle, preferably at a 7 degree angle, to form a friction self-locking mechanism with the correspondingly tapered surface of the sleeve. The tapered surface of the inner ring may be tapered at a 4 to 6 degree angle, preferably at a 5 degree angle, to form a friction self-locking mechanism with the correspondingly tapered surface of the sleeve.

According to a third aspect of the invention there is provided a rigid flange coupling comprising an outer flange defining an internal passage for receiving an internal connection assembly according to the second aspect of the invention.

The internal passage defined by the outer flange may include a shoulder against which the inner ring abuts.

The inner and outer rings of the internal connection assembly may define apertures which, in use, align with apertures in the protruding ridge of the sleeve for receiving fasteners to allow the inner and outer rings of the internal connection assembly to be pulled towards the protruding ridge thereby locking them frictionally together.

BRIEF DESCRIPTION OF THE DRAWINGS

FIG. 4 shows a side view taken along line 2-2 of the inner sleeve, as well as an enlargement of a connection formation defined between two discrete discontinuities in the wall of the inner sleeve of FIG. 2, in accordance with an example embodiment of the invention;

FIG. 5 shows a perspective view of an inner ring of one of the internal connection assemblies of FIG. 1, in accordance with an example embodiment of the invention;

DESCRIPTION OF PREFERRED EMBODIMENTS

Figure 1:
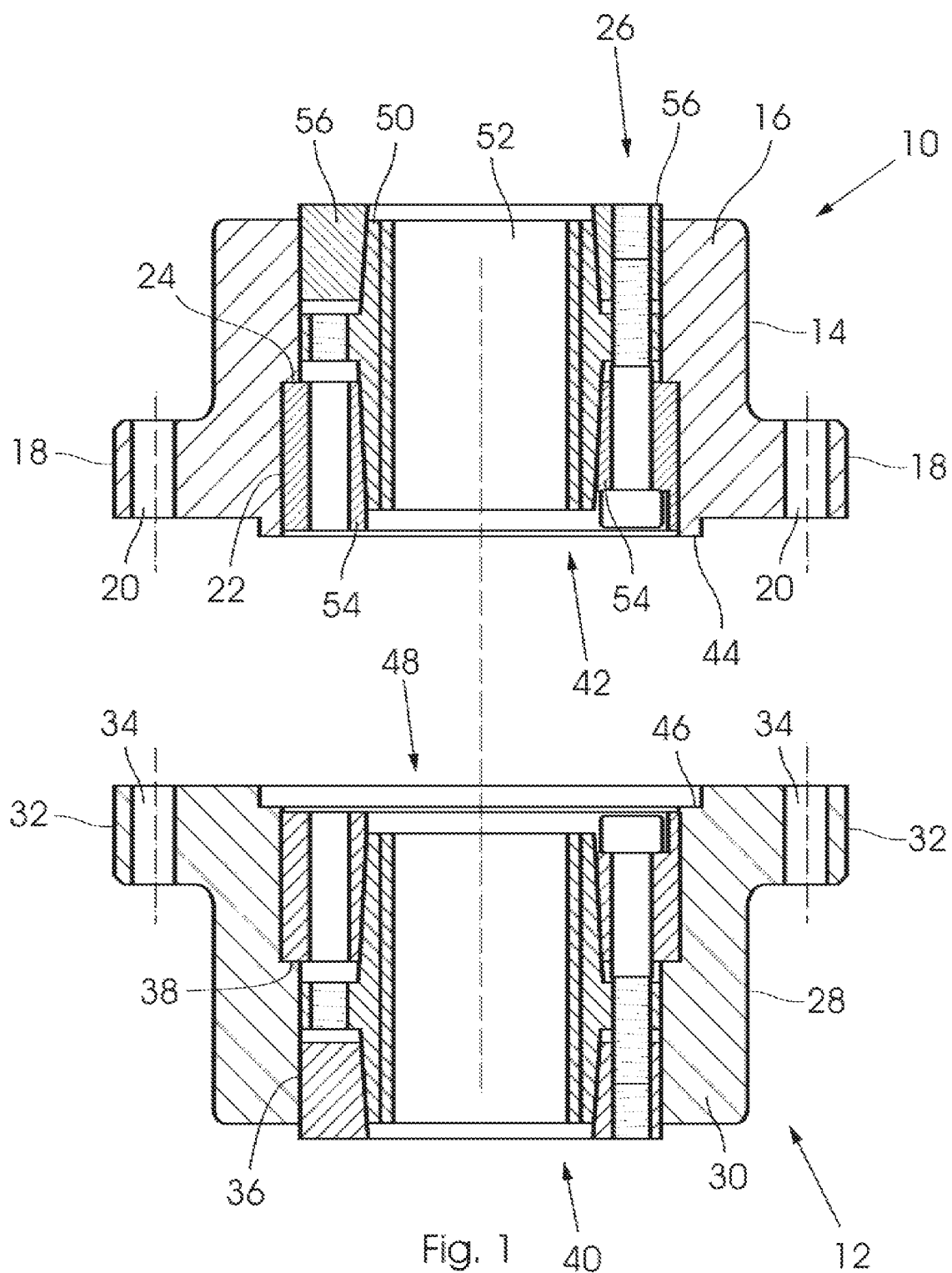
FIG. 1 shows a cross sectional view of two rigid flange couplings, each comprising an external flange and an internal flange connection assembly, to connect ends of two shafts, in accordance with an example embodiment of the invention.

Referring to FIG. 1, two rigid flange couplings, a male flange coupling 10 and a female flange coupling 12 are shown. The rigid flange couplings 10 and 12 are each respectively secured to an end of a shaft (not shown) in order to transmit power and torque between the two shafts.

The male flange coupling 10 comprises an outer flange 14 having a body 16 with an outer rim 18 extending therefrom. Multiple tapped holes 20 are defined in the outer rim 18, to receive, in use, bolts to secure the male flange coupling 10 to the female flange coupling 12. The body 16 of the outer flange 14 further defines an internal cylindrical passageway 22, having a shoulder 24. In use, the internal cylindrical passageway 22 receives and holds an internal connection assembly 26.

Similarly, the female flange coupling 12 comprises an outer flange 28 having a body 30 with an outer rim 32 extending therefrom. Multiple tapped holes 34 are also defined in the outer rim 32, which tapped holes 34 are aligned, in use, with the tapped holes 20 of the male flange coupling 10 thereby to secure the two flange couplings 10 and 12 to each other with bolts. The body 30 of the outer flange 28 further defines an internal cylindrical passageway 36, which may also have a shoulder 38. In use, the internal cylindrical passageway 36 receives and holds an internal connection assembly 40.

The male flange coupling 10 has at one end 42, which is in use the inner end, an annular protrusion 44 which fits into a recess or depression 46 defined at one end 38, which is in use the inner end, of the female flange coupling 12. The annular protrusion 44 and depression 46 allow for the alignment of the male and female couplings 10 and 12 before bolts are used to fasten the two couplings 10 and 12 together.

The internal connection assemblies 26 and 40 of the male and female flange couplings 10 and 12 are similar, and accordingly, only the internal connection assembly 26 of the male flange coupling 10 is described in detail below.

The internal connection assembly 26 comprises a partially discontinuous inner sleeve 50 which defines an internal cylindrical bore or passage 52 to receive an end of a shaft in use. It will be appreciated that the diameter of the cylindrical passage 52 may vary according to the particular application of the flange couplings. Additionally, the diameters of the cylindrical passages of the inner sleeves of the male and female flange couplings 10 and 12 may also differ, thereby to allow for the connection of differently sized shafts.

The internal connection assembly 26 further comprises two rings, an inner ring 54 and an outer ring 56, both being at least partially discontinuous. Each of the inner and outer rings 54 and 56 is received by and fits over respective ends of the inner sleeve 50. In use, the inner and outer rings 54 and 56 clamp over the respective ends of the inner sleeve, thereby holding the end of a shaft securely.

Figure 2:
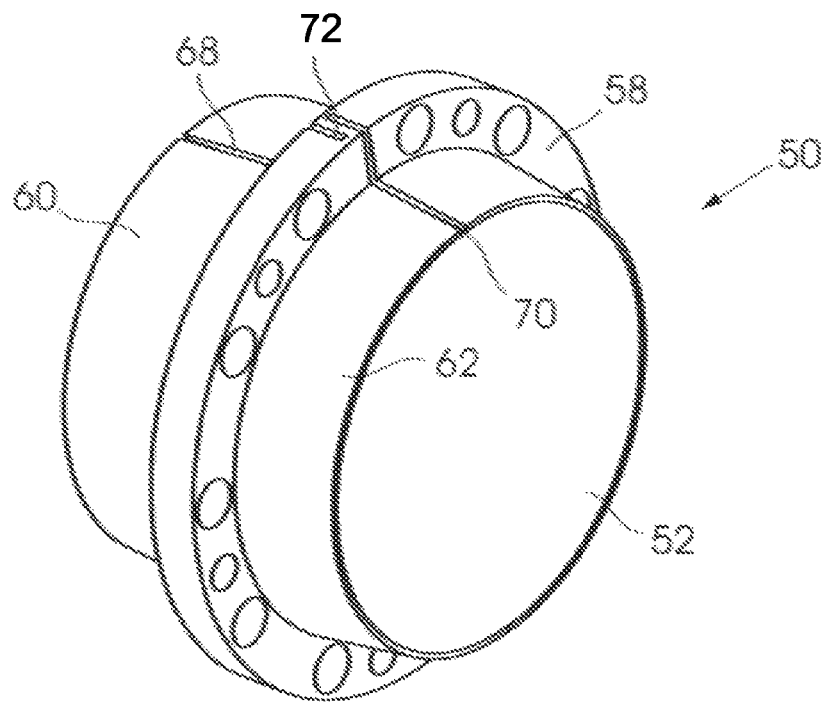
FIG. 2 shows a perspective view of an inner sleeve of one of the internal connection assemblies of FIG. 1, in accordance with an example embodiment of the invention
Figure 3:
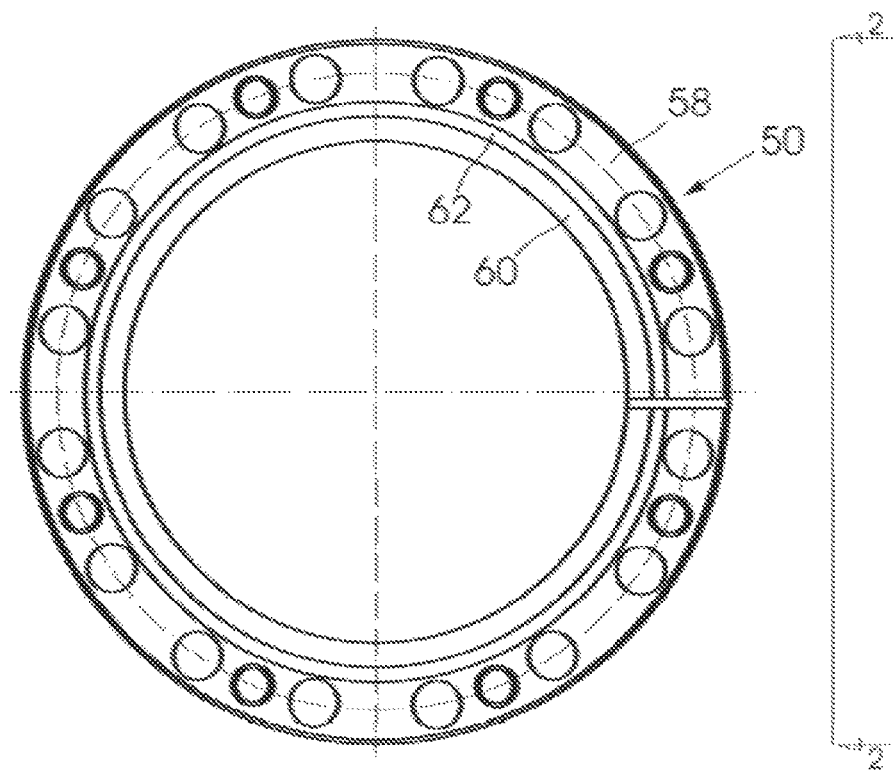
FIG. 3 shows a front view of an inner sleeve of one of the internal connection assemblies of FIG. 1, in accordance with an example embodiment of the invention.

The partially discontinuous inner sleeve 50 will now be described in more detail with reference to FIGS. 2 and 4.

The partially discontinuous inner sleeve 50 defines a protruding ridge 58 in the form of an annular flange on an outer surface of the sleeve 50. On each side of the protruding ridge a tapered surface 60 and 62 extends to the respective, axially spaced apart ends 64 and 66 of the sleeve 50.

As mentioned, the inner sleeve 50 is partially discontinuous and defines two discrete discontinuities or slits 68 and 70, each slit extending at least partially along the length of the side wall of the inner sleeve 50. In other words, the slits run in a direction substantially parallel to the axial centreline of the sleeve 50. In particular, the slit 68 extends along the side wall from the one end 64 which is, in use, the inner end of the sleeve 50, through the protruding ridge 58 and terminates at the end of the ridge distal to the sleeve inner end 64 and proximate to the sleeve end 66 which is, in use, its outer end. Similarly, the slit 70 extends along the side wall of the inner sleeve, from the other sleeve end 66, i.e. the sleeve outer end, through the protruding ridge 58 and terminates at the end of the ridge 58 distal to the sleeve outer end 66 and proximate the sleeve inner end 64. The two discontinuities or slits 68 and 70 run parallel to each other and are slightly displaced, thereby forming a connecting formation 72 in the form of a bridge section defined by the ridge portion between the two slits 68 and 70.

The width "$W_s$" of each slit 68 and 70 is typically between 2 to 8 mm, depending on the dimensions of the couplings, while the displacement or gap "$G_s$" between the two slits, i.e. the width of the connecting formation 72, is also about 2 to 8 mm.

The connecting formation 72 extends along the depth i.e. thickness of the sidewall and protruding ridge 58 of the inner sleeve 50, from one end to the other end. As the slits 68 and 70 provide discontinuities that run to the ends of the inner sleeve 50, these ends can be securely clamped around a shaft, while still ensuring alignment of the inner sleeve 50 with the inner and outer rings 54 and 56. It must be understood that the slits 68 and 70 allow the ends of the inner sleeve 50 to be deformed radially while the connecting formation 72 prevents the sleeve 50 from deforming axially. The connecting formation 72 thus allows for true alignment of the coupling, preventing excessive movement of the entire installation. In addition, the fitting and removal time of the coupling is reduced.

Figure 6:
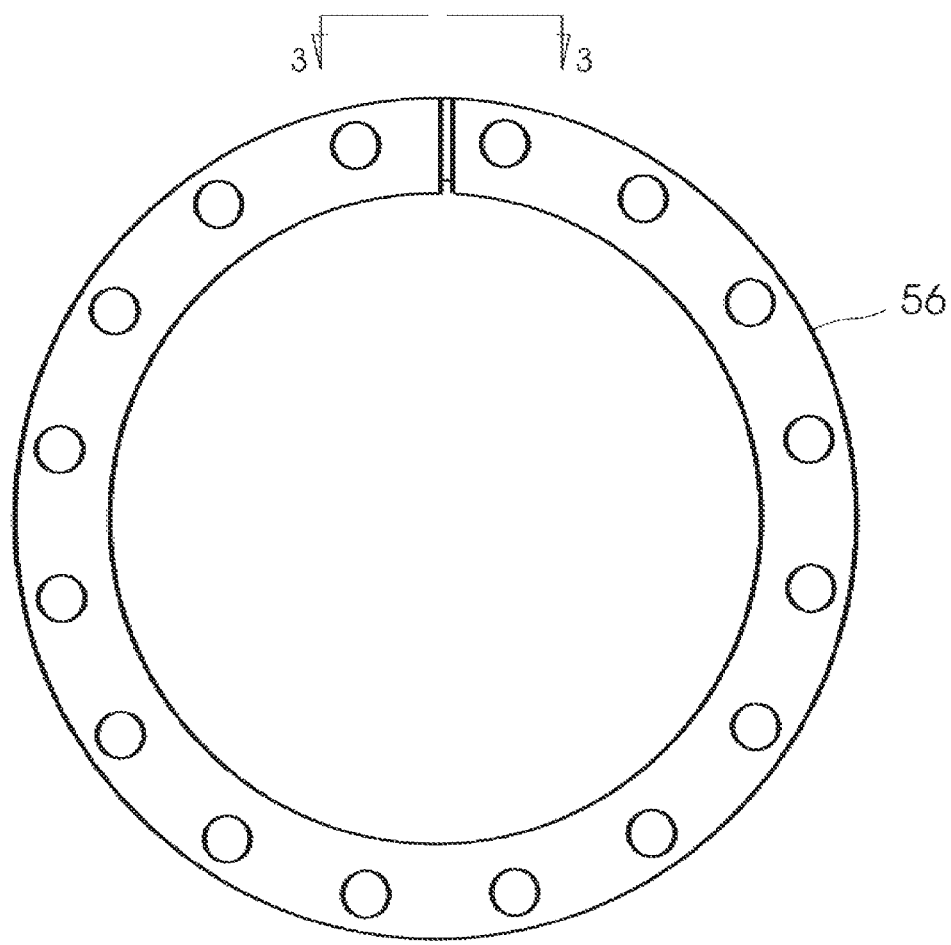
FIG. 6 shows a front view of an inner ring of one of the internal connection assemblies of FIG. 1, in accordance with an example embodiment of the invention.
Figure 7:
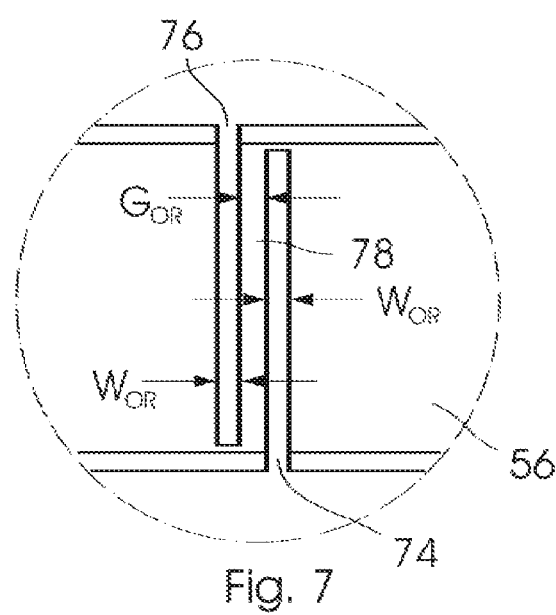
FIG. 7 shows an enlarged side view taken along line 3-3 of the inner ring, in accordance with an example embodiment of the invention.

With reference now to FIGS. 5 to 7, the outer ring 56 is shown as having a similar configuration to that the inner sleeve 50, in that the outer ring 56 defines two discontinuities or slits 74 and 76 which are parallel to each other and are connected through a bridge or outer ring connecting formation 78, which is in effect formed by the displacement between the two slits 74 and 76. Each slit 74 and 76 extends from opposite ends of the outer ring 56 and is only a partial slit, i.e. it terminates a distance from the opposite end of the outer ring, thereby forming the outer ring connecting formation 78 between them. The width "$W_{OR}$" of each slit 74 and 76 is typically between 2 and 6 mm, while the gap "$G_{OR}$" or displacement between the two slits is typically approximately 2 to 8 mm. The offset of each slit from the end of the ring is typically equal to the width "$W_{OR}$" of the slit. It must be clear that the offset is the distance from the blind end of the slit to the nearest end of the outer ring.

The inner ring 54, as will be described in more detail below, typically has a discontinuity in the form of a slit that extends from one end of the ring to the other end of the ring. In other words, the slit in the inner ring runs complete through the inner ring so that it creates a complete discontinuity.

Figure 8:
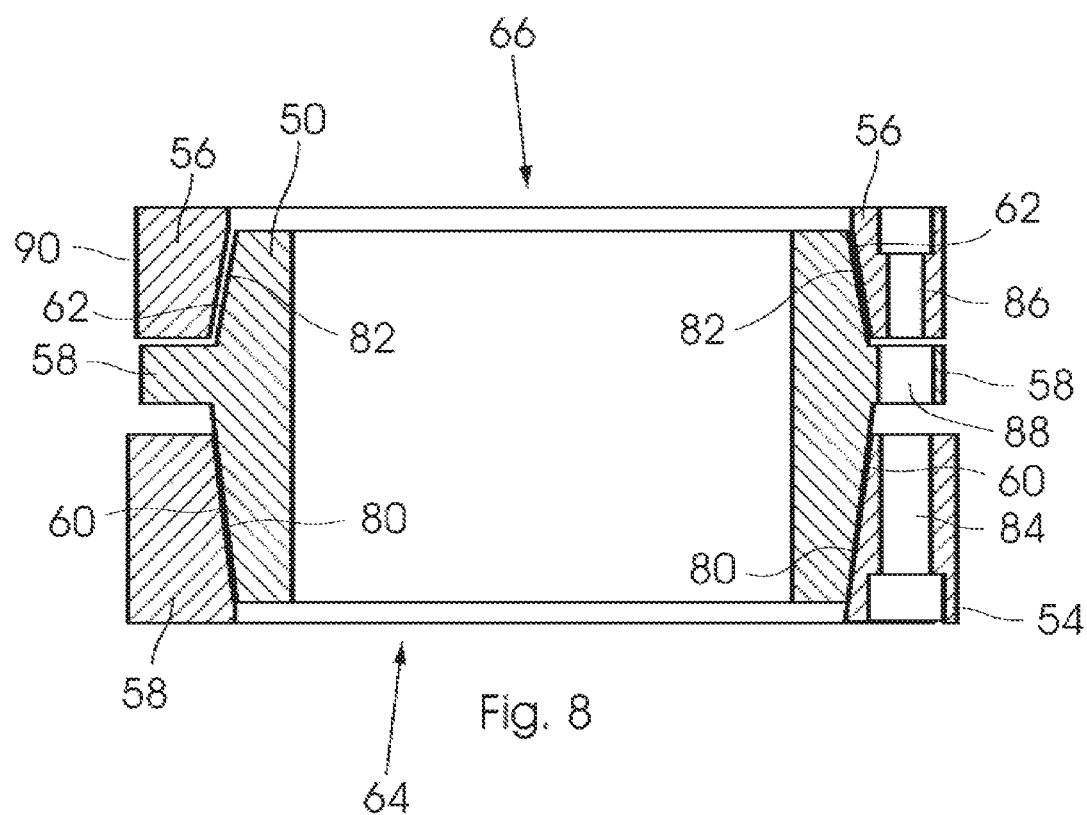
FIG. 8 shows a cross sectional view of one of the internal connection assemblies of FIG. 1, in accordance with an example embodiment of the invention.

Turning now to FIG. 8, the internal connection assembly 26 which comprises the inner and outer rings 54 and 56 located over the ends of the inner sleeve 50 will now be described. The inner and outer rings 54 and 56 defines an internal tapered surface 80 and 82 respectively, which fits over the respective tapered surfaces 60 and 62 of the inner sleeve 50. Due to the complementary tapered surfaces, the rings 54 and 56 frictionally engage the tapered surfaces 60 and 62 of the inner sleeve 50, once the parts of the internal connection assembly 26 are secured together.

One end, the outer end, of the inner ring 54 abuts the shoulder 24 defined by the internal passageway 22 of the outer flange 14 (best shown in FIG. 1) when the internal connection assembly 26 is located in the male flange 10.

As shown by FIG. 8, the inner and outer rings 54 and 56 both define apertures 84 and 86 which are aligned with apertures 88 defined in the protruding ridge 58. These apertures, which may all define an internal thread, receive fasteners such as bolts to allow the inner and outer rings 54 and 56 to be pulled towards the protruding ridge 58, thereby allowing a friction self-locking mechanism between the internal connection assembly 26 and the outer flange 14. In locking the parts of the internal connection assembly 26 together, the opposing ends of the inner sleeve 50 are urged inwards and are secured, in use, to the end of a shaft.

Figure 9:
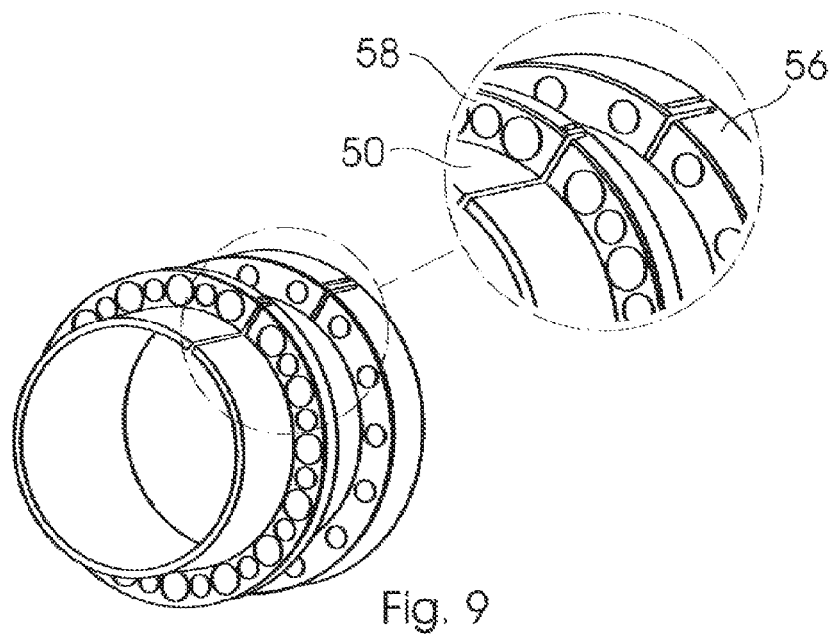
FIGS. 9 to 11 show an internal connection assembly of FIG. 1 in various states of assembly, in accordance with the present invention.
Figure 10:
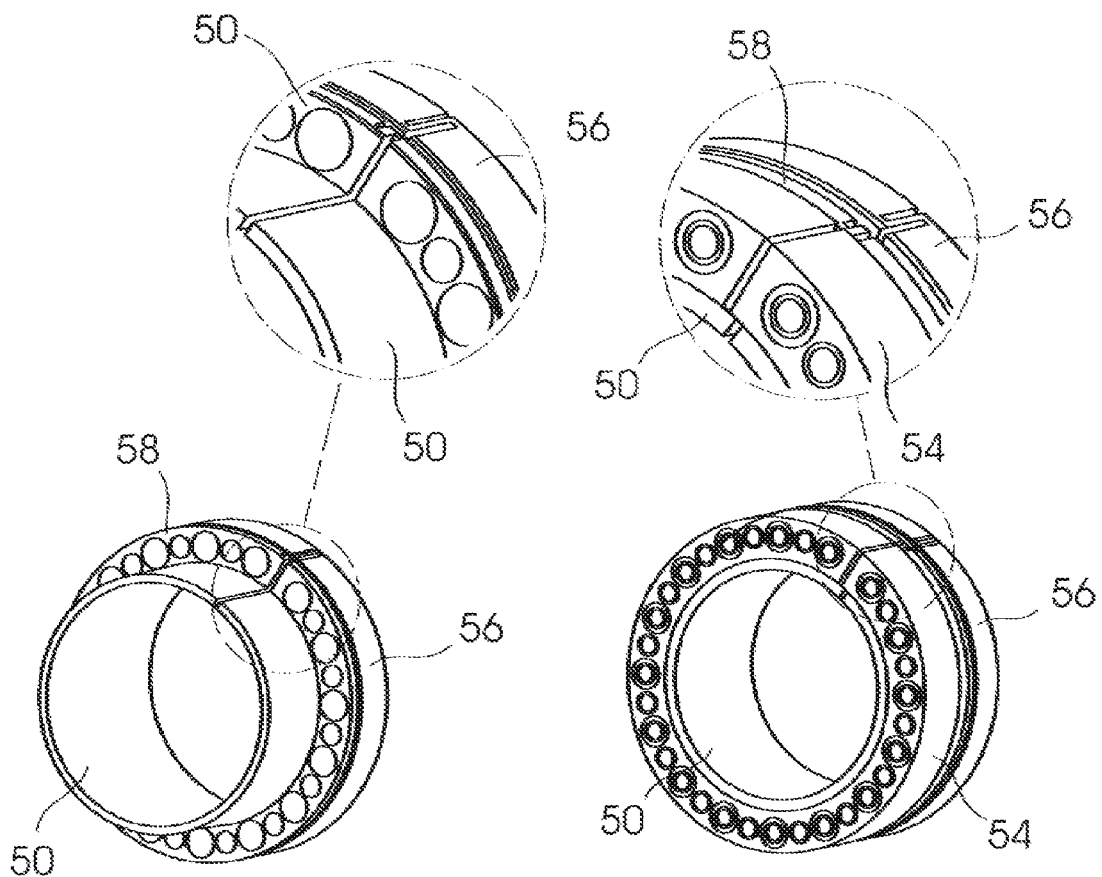

The outer ring 56 slides over the tapered surface 62 of the inner sleeve 50, as shown in FIGS. 9 and 10, thereby urging the end of the inner sleeve 50 radially inwards to clamp in onto a shaft. With both the outer ring 56 and the inner sleeve 50 defining partial discontinuities or slits, the engagement of these parts is improved, especially as the outer ring 56 has two friction surfaces, i.e. the tapered surface 82 as well as its external surface 90 which abuts the internal surface of the cylindrical passage defined by the outer flange 14. It must be clear that the improved engagement between the outer ring 56 and inner sleeve 50 is also due to the increased deformability in the radial direction resulting from the discontinuities in the sidewalls of the outer ring and the inner sleeve.

Figure 11:
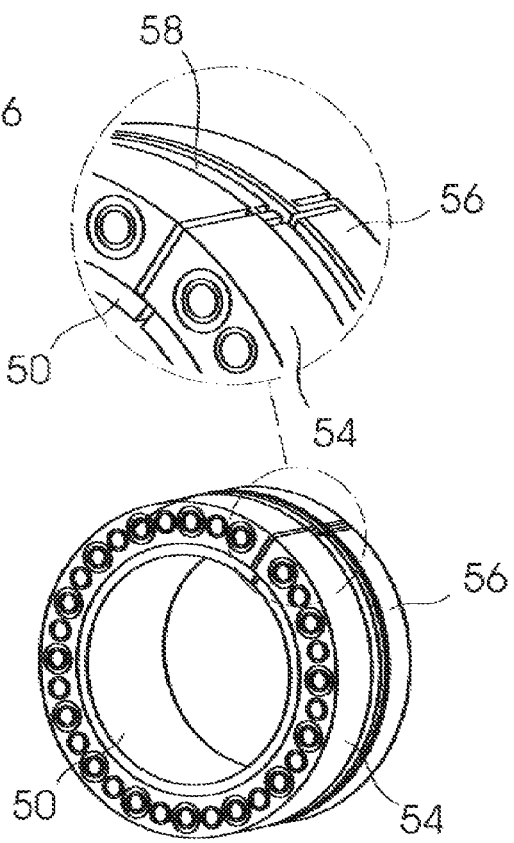

Similarly, the inner ring 54, shown as secured over the inner end of the inner sleeve 50 in FIG. 11, slides over the tapered surface 60 of the inner sleeve 50, thereby urging the end of the inner sleeve 50 inwards to clamp in onto the shaft. The inner ring 54 only has one friction surface, i.e. the tapered surface 80.

In order to counter the double friction surfaces of the outer ring 56, the tapered surface 82 of the outer ring 56 is preferably tapered at a 6 to 8 degree angle, preferably at a 7 degree angle. In order to form a complementary connection with the inner sleeve 50, the tapered surface 62 of the inner sleeve 50 is also preferably tapered at a 6 to 8 degree angle, preferably at a 7 degree angle, thereby to form the friction self-locking mechanism. Also, the tapered surface 80 of the inner ring 54 is preferably tapered at a 4 to 6 degree angle, preferably at a 5 degree angle, while the tapered surface 60 of the inner sleeve 50 is also preferably tapered at a 4 to 6 degree angle, preferably at a 5 degree angle. This allows two friction self-locking mechanisms for both the inner and outer rings 54 and 56, while countering the double friction surfaces. The 5 degree angle of the surfaces 60 and 80 provides improved locking capabilities compared to the 7 degree angle of the surfaces 62 and 82 while the 7 degree angle, in turn, provides for easy removal of the outer ring compared to the 5 degree angle on the inner ring. This is due to the difference in the force component in the radial direction resulting from the difference in taper angle. It must be understood that the 5 degree taper angle generates a larger radial force component than the 7 degree angle.

It must be understood that in order to remove the outer ring 56 deflection on its outer diameter as well as inner diameter must be overcome. It has been found that the 7 degree taper angle of the inner diameter of the outer ring 56, i.e. surface 82, allows for easy removal of the outer ring while still providing adequate locking in use. The slits 74 and 76 in the outer ring 56 further allow radial deformation to assist with the removal of the outer ring.

The configuration of the 6 to 8 degree angle on the one surface and the 4 to 6 degree angle at the other surface ensures the reusability of the coupling after dismantling and no damage to the outer ring 56 during disassembly.

To ensure the correct function of the coupling, the run-out of the coupling face should not exceed 0.05 mm (total indicator reading), measured at the biggest diameter of the flange. This will ensure the torque capability of the coupling. It should be noted that with prior art couplings, run-outs of 0.1 mm to 0.2 mm only could be achieved.

The invention claimed is:

1. An internal connection assembly for use in a rigid flange coupling, the internal connection assembly comprising:

a partially discontinuous sleeve comprising a protruding ridge on an outer surface of the sleeve and two tapered surfaces extending from each side of the protruding ridge to the respective, axially spaced apart ends of the sleeve, wherein the sleeve defines an internal cylindrical passage for, in use, receiving an end of a shaft, the partially discontinuous sleeve having at least two partial discontinuities running along the length of the sleeve in the form of two discrete axial slits in the sleeve, wherein the slits are displaced from each other between 2 to 8 mm to form a connecting formation with a width of 2 to 8 mm therebetween; and an inner and outer ring, wherein the outer ring has a partial discontinuity in the form of two partial parallel slits in a side wall of the outer ring, the outer ring slits being displaced from each other thereby to form an outer ring connecting formation.

2. An internal connection assembly according to claim 1, wherein the outer ring slits have a width of between 2 to 6 mm.

3. An internal connection assembly according to claim 1, wherein the displacement of the slits comprising the width of the outer ring connecting formation is 2 to 8 mm.

4. An internal connection assembly according to claim 1, wherein each of the inner and outer rings defines an internal tapered surface to engage frictionally the two tapered surfaces extending from a protruding ridge defined by the sleeve.

5. An internal connection assembly according to claim 4, wherein the tapered surface of the outer ring is tapered at a 6 to 8 degree angle to form a friction self-locking mechanism with the correspondingly tapered surface of the sleeve.

6. An internal connection assembly according to claim 5, wherein the tapered surface of the outer ring is tapered at a 7 degree angle.

7. An internal connection assembly according to claim 4, wherein the tapered surface of the inner ring is tapered at a 4 to 6 degree angle to form a friction self-locking mechanism with the correspondingly tapered surface of the sleeve.

8. An internal connection assembly according to claim 7, wherein the tapered surface of the inner ring is tapered at a 5 degree angle.

9. A rigid flange coupling comprising an outer flange defining an internal passage in which an internal connection assembly according to claim 1, is, in use, received when the rigid flange coupling is assembled.

10. A rigid flange coupling according to claim 9, wherein the internal passage defined by the outer flange includes a shoulder against which the inner ring abuts.

11. A rigid flange coupling according to claim 9, wherein the inner and outer rings of the internal connection assembly define apertures which, in use, align with apertures in the protruding ridge of the sleeve for receiving fasteners to allow the inner and outer rings of the internal connection assembly to be pulled towards the protruding ridge thereby locking them frictionally together.

\* \* \* \* \*